(12) United States Patent
Diggs et al.

(10) Patent No.: US 8,549,236 B2
(45) Date of Patent: Oct. 1, 2013

(54) STORAGE SUBSYSTEM WITH MULTIPLE NON-VOLATILE MEMORY ARRAYS TO PROTECT AGAINST DATA LOSSES

(75) Inventors: Mark S. Diggs, Laguna Hills, CA (US); David E. Merry, Jr., Irvine, CA (US)

(73) Assignee: SiliconSystems, Inc., Aliso Viejo, CA (US)

( * ) Notice: Subject to any disclaimer, the term of this patent is extended or adjusted under 35 U.S.C. 154(b) by 444 days.

(21) Appl. No.: 11/611,705

(22) Filed: Dec. 15, 2006

(65) Prior Publication Data

US 2008/0147962 A1    Jun. 19, 2008

(51) Int. Cl.
*G06F 12/00* (2006.01)

(52) U.S. Cl.
USPC .................. 711/154; 711/103; 711/E12.008

(58) Field of Classification Search
USPC .......... 711/162, 103, 112, 114, 154, E12.008; 710/22
See application file for complete search history.

(56) References Cited

U.S. PATENT DOCUMENTS

| 4,296,464 A | 10/1981 | Woods |
| 4,937,736 A | 6/1990 | Chang et al. |
| 5,018,096 A | 5/1991 | Aoyama |
| 5,442,768 A | 8/1995 | Sudoh |
| 5,721,873 A | 2/1998 | Tobita et al. |
| 5,737,563 A | 4/1998 | Shigeeda |
| 5,740,397 A * | 4/1998 | Levy .......................... 711/114 |
| 5,768,612 A | 6/1998 | Nelson |
| 5,784,698 A | 7/1998 | Brady et al. |
| 5,890,219 A | 3/1999 | Scaringella et al. |
| 6,000,006 A | 12/1999 | Bruce et al. |
| 6,014,727 A | 1/2000 | Creemer |
| 6,052,799 A | 4/2000 | Li et al. |
| 6,081,878 A | 6/2000 | Estakhri et al. |
| 6,088,765 A | 7/2000 | Ohtsuka |
| 6,092,095 A | 7/2000 | Maytal |
| 6,134,631 A | 10/2000 | Jennings, III |
| 6,173,360 B1 | 1/2001 | Beardsley et al. |
| 6,223,252 B1 * | 4/2001 | Bandera et al. ............... 711/114 |
| 6,249,838 B1 | 6/2001 | Kon |

(Continued)

FOREIGN PATENT DOCUMENTS

| EP | 0 589 597 A3 | 3/1994 |
| JP | 05-100801 | 4/1993 |
| WO | 2006118646 A2 | 9/2006 |

OTHER PUBLICATIONS

Andrew S. Tanenbaum, "Structured Computer Organization", 1984, Prentice-Hall, Inc., 3rd edition, pp. 11-13.*

(Continued)

*Primary Examiner* — Pierre-Michel Bataille

(57) ABSTRACT

A storage subsystem contains multiple non-volatile memory arrays that are accessible to a host system when the storage subsystem is connected thereto. The storage subsystem implements commands and/or modes for enabling the host system to create and use backup copies of files, such that the host system can recover when files become corrupted or otherwise lost. In one embodiment, the storage subsystem presents the non-volatile memory arrays to the host's operating system as distinct storage devices (e.g., ATA device 0 and 1), and implements special commands for copying data between these storage devices. The subsystem may alternatively present the memory arrays to the host operating system as a single storage device. The storage subsystem may have a standard form factor, such as a form factor commonly used for memory cards.

17 Claims, 3 Drawing Sheets

(56) References Cited

U.S. PATENT DOCUMENTS

| | | |
|---|---|---|
| 6,269,434 B1 | 7/2001 | Tanaka |
| 6,272,589 B1 | 8/2001 | Aoki |
| 6,286,087 B1 | 9/2001 | Ito et al. |
| 6,324,627 B1 | 11/2001 | Kricheff et al. |
| 6,401,214 B1 | 6/2002 | Li |
| 6,434,648 B1 | 8/2002 | Assour et al. |
| 6,452,950 B1 | 9/2002 | Ohlsson et al. |
| 6,484,229 B1 | 11/2002 | Ichikawa et al. |
| 6,530,034 B1 | 3/2003 | Okada et al. |
| 6,546,456 B1 | 4/2003 | Smith et al. |
| 6,564,173 B1 | 5/2003 | Arntz et al. |
| 6,633,963 B1 | 10/2003 | Ellison et al. |
| 6,675,281 B1 | 1/2004 | Oh et al. |
| 6,694,381 B1 | 2/2004 | Lo et al. |
| 6,704,012 B1 | 3/2004 | Lefave |
| 6,732,221 B2 | 5/2004 | Ban |
| 6,735,636 B1* | 5/2004 | Mokryn et al. ............ 710/5 |
| 6,754,765 B1 | 6/2004 | Chang et al. |
| 6,761,580 B2 | 7/2004 | Chang |
| 6,792,519 B2 | 9/2004 | Constable et al. |
| 6,871,272 B2 | 3/2005 | Butterworth |
| 6,892,248 B2 | 5/2005 | Thayer |
| 6,944,063 B2 | 9/2005 | Chen et al. |
| 6,944,717 B2 | 9/2005 | Yoneyama et al. |
| 6,968,434 B2 | 11/2005 | Kamano et al. |
| 6,976,190 B1 | 12/2005 | Goldstone |
| 6,978,398 B2* | 12/2005 | Harper et al. ............ 714/13 |
| 6,996,623 B1 | 2/2006 | Kawano et al. |
| 7,024,410 B2 | 4/2006 | Ito et al. |
| 7,054,986 B2 | 5/2006 | Zhao et al. |
| 7,079,395 B2 | 7/2006 | Garnett et al. |
| 7,103,798 B2* | 9/2006 | Morita .................. 714/6 |
| 7,114,051 B2 | 9/2006 | Guu et al. |
| 7,139,871 B2 | 11/2006 | Mizuno |
| 7,139,890 B2 | 11/2006 | Moran et al. |
| 7,210,013 B2 | 4/2007 | Itoh et al. |
| 7,213,117 B2 | 5/2007 | Wakabayashi et al. |
| 7,262,961 B2 | 8/2007 | Motoe et al. |
| 7,277,978 B2 | 10/2007 | Khatami et al. |
| 7,447,807 B1 | 11/2008 | Merry et al. |
| 7,447,944 B2 | 11/2008 | Hu |
| 7,464,306 B1 | 12/2008 | Furuhjelm et al. |
| 7,467,258 B2* | 12/2008 | Murayama ............... 711/114 |
| 7,509,441 B1 | 3/2009 | Merry et al. |
| 7,596,643 B2 | 9/2009 | Merry, Jr. et al. |
| 7,653,778 B2* | 1/2010 | Merry et al. ............. 711/103 |
| 7,684,417 B2* | 3/2010 | Imai et al. .............. 370/401 |
| 7,694,188 B2 | 4/2010 | Raghuraman et al. |
| 7,765,373 B1 | 7/2010 | Merry et al. |
| 7,912,991 B1 | 3/2011 | Merry et al. |
| 7,962,792 B2 | 6/2011 | Diggs et al. |
| 8,078,918 B2* | 12/2011 | Diggs et al. ............. 714/42 |
| 8,122,185 B2 | 2/2012 | Merry, Jr. et al. |
| 8,127,048 B1 | 2/2012 | Merry et al. |
| 8,151,020 B2 | 4/2012 | Merry, Jr. et al. |
| 2002/0138602 A1 | 9/2002 | Vinberg |
| 2003/0069671 A1 | 4/2003 | Yashiki et al. |
| 2003/0131093 A1 | 7/2003 | Aschen et al. |
| 2003/0188007 A1 | 10/2003 | Unger |
| 2003/0200388 A1 | 10/2003 | Hetrick |
| 2003/0227451 A1 | 12/2003 | Chang |
| 2004/0128414 A1 | 7/2004 | Rudelic |
| 2004/0145952 A1 | 7/2004 | Chen et al. |
| 2004/0190877 A1 | 9/2004 | Matsuno et al. |
| 2004/0210796 A1* | 10/2004 | Largman et al. ............ 714/20 |
| 2004/0228197 A1 | 11/2004 | Mokhlesi et al. |
| 2004/0246841 A1 | 12/2004 | Miyamoto |
| 2004/0260967 A1 | 12/2004 | Guha et al. |
| 2005/0036387 A1 | 2/2005 | Seal et al. |
| 2005/0044454 A1 | 2/2005 | Moshayedi |
| 2005/0047396 A1 | 3/2005 | Helm et al. |
| 2005/0138306 A1* | 6/2005 | Panchbudhe et al. ....... 711/162 |
| 2005/0160195 A1 | 7/2005 | Bruner et al. |
| 2005/0196165 A1 | 9/2005 | Dybsetter et al. |
| 2005/0197017 A1 | 9/2005 | Chou et al. |
| 2005/0210098 A1* | 9/2005 | Nakamichi et al. .......... 709/203 |
| 2005/0268007 A1 | 12/2005 | Nakabayashi |
| 2005/0281112 A1 | 12/2005 | Ito et al. |
| 2005/0289275 A1* | 12/2005 | Jung et al. ............... 710/305 |
| 2006/0056813 A1 | 3/2006 | Sutardja |
| 2006/0069866 A1* | 3/2006 | Miyazaki ................ 711/114 |
| 2006/0085670 A1 | 4/2006 | Carver et al. |
| 2006/0085836 A1 | 4/2006 | Lyons, Jr. et al. |
| 2006/0095647 A1 | 5/2006 | Battaglia et al. |
| 2006/0095699 A1 | 5/2006 | Kobayashi et al. |
| 2006/0143426 A1 | 6/2006 | Wu |
| 2006/0159098 A1 | 7/2006 | Munson et al. |
| 2006/0179218 A1* | 8/2006 | Burkey .................. 711/114 |
| 2006/0190696 A1 | 8/2006 | Ito et al. |
| 2006/0200627 A1 | 9/2006 | Iftikar |
| 2006/0212750 A1* | 9/2006 | Denninghoff et al. .......... 714/6 |
| 2006/0248487 A1 | 11/2006 | Nicholson et al. |
| 2006/0282709 A1 | 12/2006 | Shu et al. |
| 2006/0294338 A1 | 12/2006 | Fisher et al. |
| 2007/0008186 A1 | 1/2007 | Michaels et al. |
| 2007/0053513 A1 | 3/2007 | Hoffberg |
| 2007/0073944 A1 | 3/2007 | Gormley |
| 2007/0079097 A1 | 4/2007 | Karnowski et al. |
| 2007/0124130 A1 | 5/2007 | Brunet et al. |
| 2007/0124542 A1 | 5/2007 | Ven |
| 2007/0159710 A1 | 7/2007 | Lucas et al. |
| 2007/0180328 A1 | 8/2007 | Cornwell et al. |
| 2007/0201814 A1 | 8/2007 | Yamauchi |
| 2007/0260811 A1* | 11/2007 | Merry et al. ............. 711/103 |
| 2007/0266200 A1 | 11/2007 | Gorobets et al. |
| 2007/0268791 A1 | 11/2007 | Grow et al. |
| 2007/0283090 A1* | 12/2007 | Kaji et al. .............. 711/114 |
| 2008/0046766 A1 | 2/2008 | Chieu et al. |
| 2008/0109591 A1 | 5/2008 | Kim et al. |
| 2008/0294669 A1* | 11/2008 | Narayanan .............. 707/101 |
| 2009/0037643 A1 | 2/2009 | Ohtsuka et al. |
| 2009/0063895 A1 | 3/2009 | Smith |
| 2010/0011260 A1 | 1/2010 | Nagadomi et al. |
| 2010/0023800 A1* | 1/2010 | Harari et al. ............. 714/2 |
| 2012/0151130 A1 | 6/2012 | Merry, Jr. et al. |

OTHER PUBLICATIONS

Webpage printed out from <http://www.m-systems.com/site/en-US/Support/DeveloperZone/Software/LifespanCalc.htm> on Jun. 13, 2006.

Webpage printed out from <http://www.m-systems.com/site/en-US/Technologies/Technology/TrueFFS_Technology.htm> on Jun. 13, 2006.

Webpage printed out from <http://www.techworld.com/storage/features/index.cfm?FeatureID=498> on Jun. 13, 2006.

International Search Report and Written Opinion in PCT Application No. PCT/US2007/68490; Dated Sep. 29, 2008 in 11 pages.

Document explaining prior sale.

Silicondrive User'S Guide, SiSMART Function, Preliminary Version 2.2 Revision A, Feb. 2005.

International Search Report and Written Opinion for International Application No. PCT/US09/32984, mailed on Mar. 17, 2009, in 10 pages.

International Search Report and Written Opinion for International Application No. PCT/US09/33262, mailed on Mar. 25, 2009, in 10 pages.

SFF Committee Specification, "Self-Monitoring, Analysis and Reporting Technology (SMART) SFF-8035i Revision 2.0", Apr. 1, 1996 in 24 pages.

European Search Report dated Dec. 22, 2011 received in European Application No. 07762018.5 in 10 pages.

* cited by examiner

| REGISTER | DATA | | | | | | | |
|---|---|---|---|---|---|---|---|---|
| | D7 | D6 | D5 | D4 | D4 | D2 | D1 | D0 |
| FEATURE | X | X | X | X | X | X | MIRROR MODE ON/OFF | SWITCH DEVICE MODE ON/OFF |
| COMMAND | XXh | | | | | | | |

FIG.2

| REGISTER | DATA | | | | |
|---|---|---|---|---|---|
| FEATURE | X | | | | |
| SECTOR COUNT | 01h | | | | |
| SECTOR NUMBER | ZONE NUMBER = 01h,02h,03h,04h OR 05h | | | | |
| CYLINDER LOW | 0 | | | | |
| CYLINDER HIGH | 0 | | | | |
| DRIVE/HEAD | 1 | X | 1 | DRIVE | X |
| COMMAND | COMMAND (VVh = BACKUP ALL, WWh = RESTORE ALL) | | | | |

FIG.3

| REGISTER | DATA | | | | |
|---|---|---|---|---|---|
| FEATURE | X | | | | |
| SECTOR COUNT | SECTOR COUNT | | | | |
| SECTOR NUMBER | SECTOR NUMBER (LBA 7-0) | | | | |
| CYLINDER LOW | CYLINDER LOW (LBA 15-8) | | | | |
| CYLINDER HIGH | CYLINDER HIGH (LBA 23-26) | | | | |
| DRIVE/HEAD | 1 | LBA | 1 | DRIVE | HEAD (LBA 27-24) |
| COMMAND | COMMAND (XXh = MIRROR, YYh = BACKUP, ZZ = RESTORE) | | | | |

FIG.4

STORAGE SUBSYSTEM WITH MULTIPLE NON-VOLATILE MEMORY ARRAYS TO PROTECT AGAINST DATA LOSSES

BACKGROUND OF THE INVENTION

1. Field of the Invention

The present invention relates to solid-state storage subsystems. More specifically, the present invention relates to providing data redundancy within a solid-state storage subsystem.

2. Description of the Related Art

Companies are increasingly relying on portable solid-state storage subsystems to persistently store executable code and data. Typically, these subsystems are in the form of a memory card or drive that connects to an external port or connector of a host computer system. Because solid-state storage subsystems tend to be lighter, smaller and more shock resistant than magnetic disk drives, they are especially useful for applications involving portability. In many cases, the solid-state storage subsystem is used by the host system as a boot device (i.e., it stores the operating system code executed by the host computer), and/or is used to persistently store data generated or captured by the host computer.

One problem with existing solid-state storage subsystems is that they typically do not provide a sufficient degree of protection against data losses. Such data losses are typically caused by memory wear, memory array controller malfunctions, or rampant host software that overwrites important data. When such data losses occur, they can result in significant down time and lost revenue, especially if the storage subsystem is used to store operating system files or critical data.

SUMMARY

The present invention comprises a storage subsystem which contains multiple non-volatile memory arrays that are accessible to a host system when the storage subsystem is connected thereto. The storage subsystem implements commands and/or modes for enabling the host system to create and use backup copies of files, such that the host system can recover when files become corrupted or otherwise lost. In one embodiment, the storage subsystem presents the non-volatile memory arrays to the host's operating system as distinct storage devices (e.g., ATA device 0 and 1), and implements special commands for copying data between these disk drives. The subsystem may alternatively present the memory arrays to the host operating system as a single storage device. The storage subsystem may have a standard form factor, such as a form factor commonly used for memory cards.

BRIEF DESCRIPTION OF THE DRAWINGS

Specific embodiments of the invention will now be described with reference to the following drawings:

FIG. 2 illustrates an example command format for placing the storage subsystem into particular modes;

FIG. 3 illustrates an example command format for issuing "backup all" and "restore all" commands to the storage subsystem;

FIG. 4 illustrates an example command format for issuing mirror, backup and restore commands to the storage subsystem.

DETAILED DESCRIPTION OF SPECIFIC EMBODIMENTS

Specific embodiments of the invention will now be described with reference to the drawings. This description is intended to illustrate example implementations of, and applications for, the present invention, and is not intended to be limiting. Nothing in this description is intended to imply that any particular feature, characteristic, or mode of operation is a requirement of the invention. The invention is defined by the claims.

I. OVERVIEW

Figure 1:
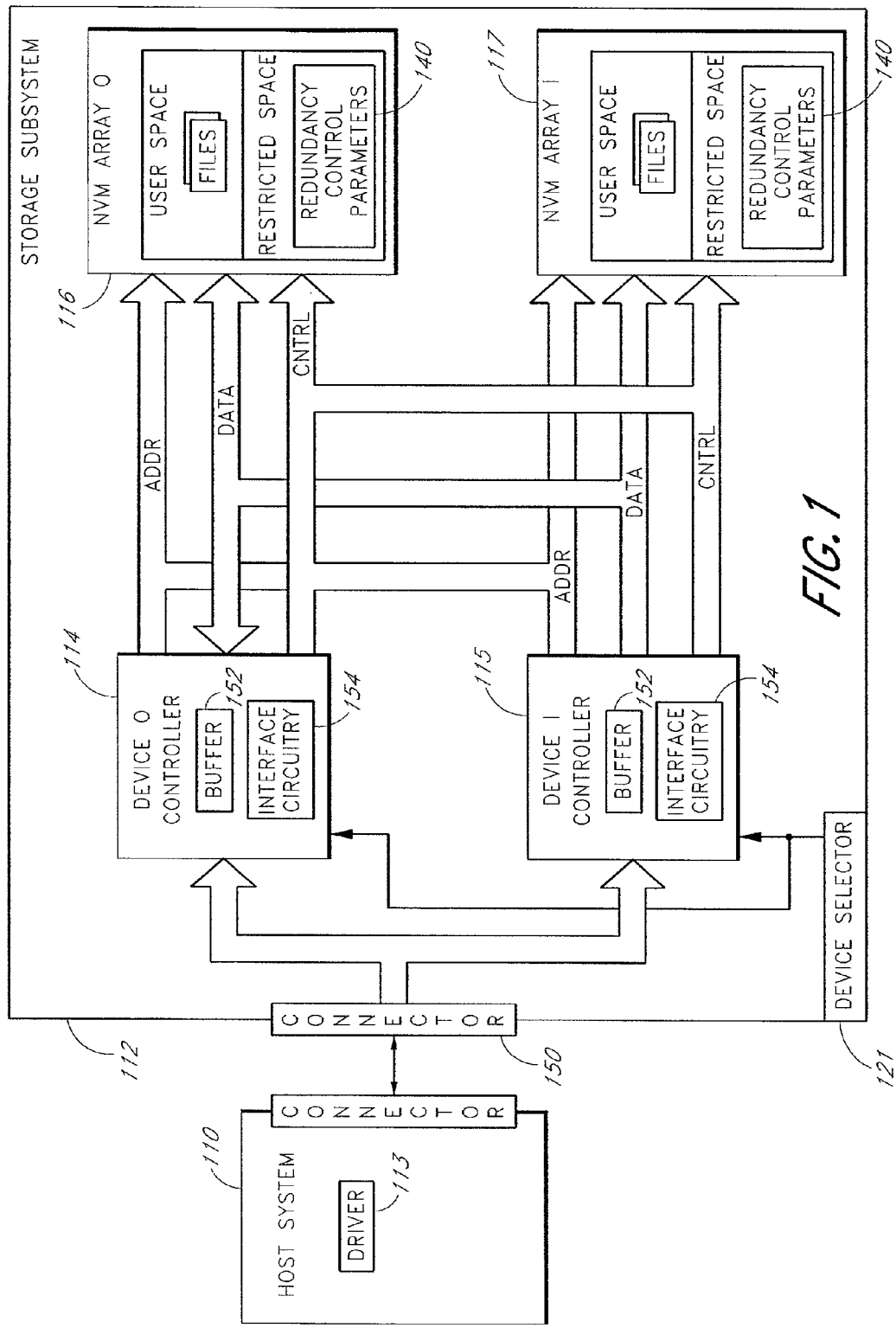
FIG. 1 is a block diagram illustrating a solid-state storage subsystem containing multiple non-volatile memory arrays and controllers according to one embodiment of the invention.

FIG. 1 illustrates a solid-state storage subsystem 112 with two non-volatile memory (NVM) arrays 116 and 117 according to one embodiment of the invention. The storage subsystem 112 is shown connected to a host system 110, which may, for example, be a portable computer, a router, a server, a medical device, or any other type of computing device. The host system 100 may, but need not, be designed to boot from, and execute application software stored on, the storage subsystem 112. The host system 100 may additionally or alternatively use the storage subsystem 112 to log data generated or captured by the host system. Typically, the storage subsystem is powered solely by the host system 110, although the storage subsystem may include a battery in some embodiments.

The host system 110 executes a special driver 113 or other software component that communicates with the subsystem 112 using the subsystem's command set. As discussed below, this command set preferably includes both standard ATA commands, and non-standard or "vendor-specific" commands for performing various types of data backup and restore operations. The subsystem 112 may also be used with hosts that do not execute special driver software (i.e., a standard operating system driver may be used), although the subsystem's non-standard backup and restore operations will not be available to the host in such configurations.

In the illustrated embodiment, the first NVM array 116 is controlled primarily by a first controller 114, and the second NVM array 117 is controlled primarily by a second controller 115. However, in other embodiments, both NVM arrays 116, 117 may be controlled exclusively by a single controller. Where two controllers 114 and 115 are provided as shown, each controller/memory array pair preferably appears to the host system 110 as a separate ATA disk drive, with one configured as device 0 (the "master") and the other as device 1 (the "slave"). Thus, the host system 110 can selectively write data to, and read data from, each of the NVM arrays 116 and 117 using standard ATA disk drive commands. More specifically, each controller 114 and 115 is configured to write data to, and read data from, its respective the NVM array 116 and 117 in response to commands from the host system 110.

Figure 5:
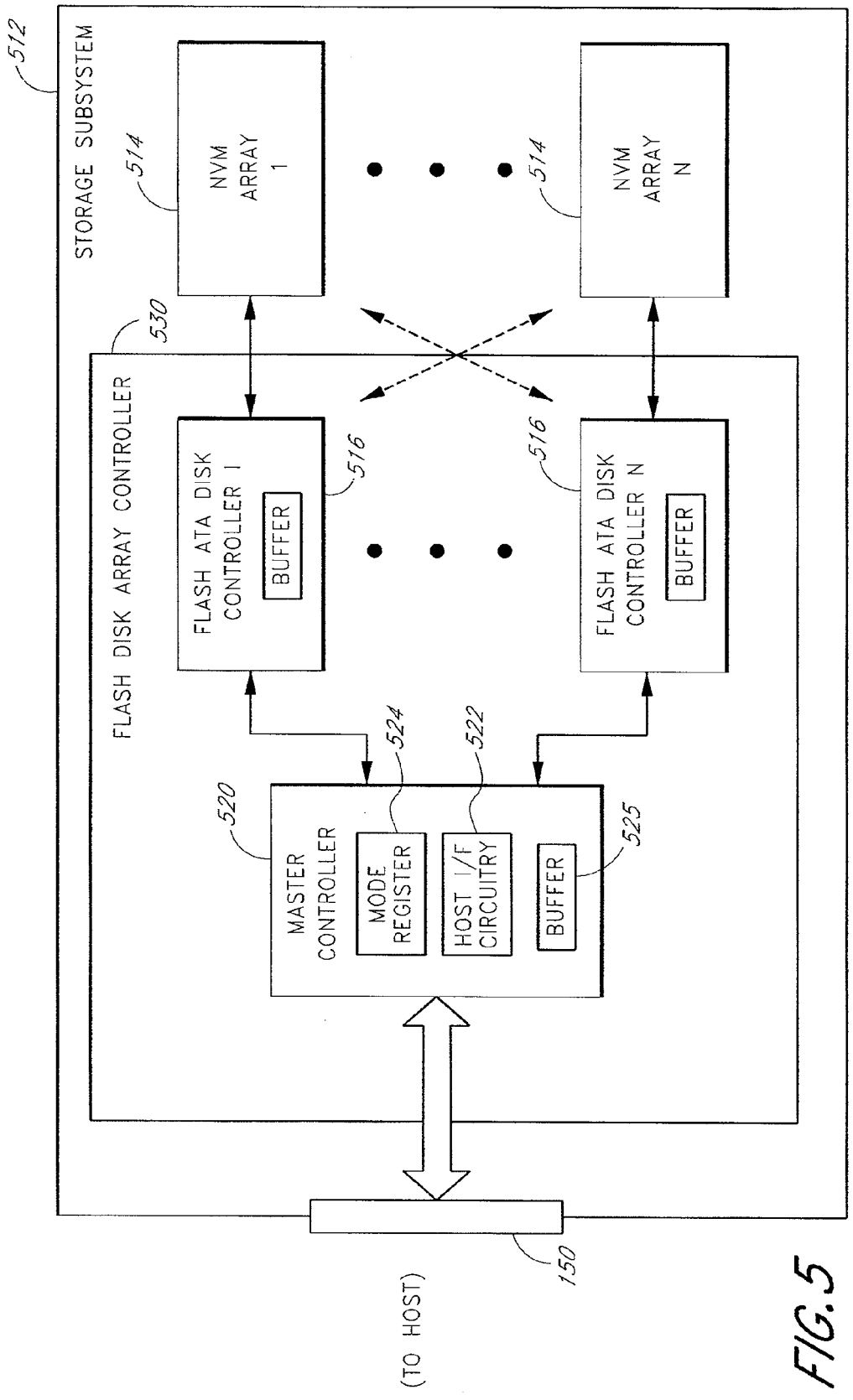
FIG. 5 illustrates a solid-state storage subsystem according to another embodiment of the invention.

The design shown in FIG. 1 may alternatively be implemented such that one of the two devices (device 0 or device 1) or memory arrays is hidden from the host's operating system. With this approach, the "hidden" device or array can be accessed by the host via special vendor-specific commands, or, in some embodiments, by placing the storage subsystem in a "switch device" mode (discussed below) in which device 0 and 1 are effectively swapped. The ability to make one of the devices or arrays hidden may be a configuration option that can be set via a vendor-specific command. FIG. 5, which is discussed below, illustrates one example of a subsystem architecture that is capable of using a hidden non-volatile memory array to maintain a backup copy of data written to an exposed non-volatile memory array.

Although two NVM arrays are used in the embodiment of FIG. 1, a greater number of NVM memory arrays may be provided. For example, in embodiments based on the SCSI or standard (which allow more than two disk drives to share a common cable), three or more controller/memory-array pairs may be provided, each of which appears to the host as a respective SCSI or SATA disk drive. As another example, in an ATA implementation, three or more memory arrays may be provided with only two of these arrays being exposed to the host as ATA drives. The storage subsystem 112 may use the other memory array(s) to perform backup and restore operations transparently to the host, or to otherwise provide redundancy. For instance, the storage subsystem 112 could implement an internal RAID array (using, e.g., a RAID 0, 1, 2, 3, 4, or 5 configuration, as discussed below), but could present the array to the host as a single virtual disk drive.

Referring again to FIG. 1, each controller 114, 115 accesses its respective NVM array 116, 117 via a corresponding address, data, and control busses. These busses are preferably cross-coupled such that the device 0 controller can directly access NVM array 1, and such that the device 1 controller can directly access NVM array 0. This arrangement enables each controller to execute various types of backup and restore operations, as described below, and also allows the data stored in both NVM arrays to be accessed in the event of a single-controller failure. During ordinary ATA operation, isolation circuitry (not shown) isolates device 0's address, data and control busses from those of device 1, such that the two controllers can access their respective NVM arrays in parallel. In other embodiments, rather than using cross coupled busses as shown, each controller 114, 115 may be capable of accessing the other's NVM array 116, 117 only indirectly via controller-to-controller communications.

As further illustrated in FIG. 1, each NVM array 116, 117 is preferably subdivided into a "user" space and a "restricted" (non-user) space. The user space is the memory area that is exposed to the host's operating system (i.e., the host 110 can write data to, and read data from, this area) via standard ATA commands. In contrast, the restricted space can only be accessed by the host via one or more vendor-specific commands, and thus is not exposed to the host's operating system. The restricted spaces are used by the storage subsystem 112 to store various control parameters, including redundancy control parameters 140 used to implement backup and restore functions. The redundancy control parameters are preferably maintained in each NVM array in a predefined location within a 512-byte block that is read/write accessible via a particular vendor-specific command. The restricted spaces may also store firmware executed by the respective controllers 114, 115.

The storage subsystem 112 comprises a physical connector 150 for detachably connecting to the host 110. The connector 150 and associated signal interface preferably comply with an industry-standard such as a USB, SATA (Serial ATA), PC Card/PCMCIA, PCI Express, Firewire (IEEE 1394), Parallel ATA (PATA), CompactFlash (CF), Secure Digital (SD), or Memory Stick (among others). The subsystem 112 may alternatively be designed to communicate with the host 110 via a wireless interface, such as a Bluetooth interface, or via a non-standard interface.

Although not separately illustrated in FIG. 1, the storage subsystem comprises a housing that houses the subsystem's electrical components. The housing and connector may, but need not, have a standard form factor such as a CF, PC Card/PCMCIA, MultiMediaCard, SmartMedia, Memory Stick, SecureDigital or hard disk drive (e.g., 2.5" drive) form factor.

As will be apparent, the storage subsystem 112 provides data redundancy features that are typically available only in relatively large systems, such as disk array systems containing multiple magnetic disk drives. Unlike conventional disk array systems, however, the storage subsystem 112 can advantageously be implemented as a highly compact device that does not require any cabling, and that is powered by the host 110 via the same standard connection used for data. For example, the storage subsystem 112 can be implemented as a PCMCIA, CF or SD card or as a USB flash drive.

The two controllers 114 and 115 may be identical to each other. Each may be provided as separate integrated circuit, or both may be integrated within a common integrated circuit. As illustrated, each includes a respective buffer 152 (implemented in volatile RAM) for buffering data being written to or read from non-volatile memory, and includes interface circuitry 154 for implementing the appropriate signal interface for communicating with the host. The controllers 114 and 115 are preferably capable of executing firmware, although the functions embodied firmware may alternatively be implemented in state machine logic. In addition to implementing the ATA specification, the controllers 114, 115 may be capable of executing USB commands, PC Card commands, or CF commands, or commands associated with another specification.

The NVM arrays 116, 117 may be implemented using NAND memory devices, NOR memory devices, and/or any other type of solid-state non-volatile memory device. The solid-state memory devices may be physically divided into blocks, pages and sectors, as is known in the art.

II. SPECIAL MODES FOR CREATING AND USING BACKUP COPIES

To facilitate use of the dual NVM arrays to protect against losses, the storage subsystem 112 preferably implements two special modes, referred to as "mirror mode" and "switch device mode." The subsystem 112 may be placed in one of these modes via a vendor-specific "mode set" command, the general format of which is shown in FIG. 2. When such a mode set command is sent to the subsystem 112, each controller 114, 115 updates its respective mode register (not shown) to indicate the currently selected mode, and also updates the redundancy control parameters 140 stored in its respective NVM array. When the storage subsystem 112 is powered up, each controller 114, 115 loads some or all of the redundancy control parameters into its respective mode register to select the appropriate mode of operation.

As discussed in the following section, the storage subsystem also preferably implements a set of special (vendor-specific) commands for mirroring, backing up and restoring blocks of data. It should be understood that the particular modes and commands described herein are merely illustrative, and are not required to practice the invention. For example, in embodiments in which three of more separate NVM arrays are provided, a very different set of special modes and/or commands will typically be used.

Mirror Mode

When in mirror mode, the storage subsystem 112 writes to both NVM arrays 116, 117 when a standard write command is issued by the host. This mode may advantageously be used to efficiently mirror important files across the two NVM arrays/ATA devices. For example, a host system could initially place the subsystem in mirror mode, then write a set of OS (operating system) files, or other important files, to either device 0 or device 1 via standard ATA write commands. This would cause these files to be written to both devices/arrays, such that a backup copy is available if, for example, one copy becomes corrupted. As discussed below, mirrored copies of files can also be created using the mirror command.

The mirror mode is preferably implemented by having each controller 114, 115 perform a write to its respective NVM array whenever a standard write command is received, regardless of whether this command is directed to device 0 or device 1. Alternatively, the controller to which the write command is directed could write the data to both NVM arrays.

In some embodiments, the storage subsystem may also implement an "address constrained" mirror mode in which only those writes falling within a particular address range or zone are mirrored. For example, a particular zone may be created in one of the NVM arrays for storing mission critical data, and all writes to this zone may automatically be mirrored to a corresponding zone of the other NVM array. The storage subsystem 112 may create such zones in response to host command as disclosed in U.S. patent application Ser. No. 11/480,303, filed on Jun. 30, 2006, the disclosure of which is hereby incorporated by reference.

Switch Device Mode

When in "switch device" mode, the storage subsystem 112 switches the designations of device 0 and device 1 as recognized by the host system 110 for purposes of all read and write commands. Thus, if the host 110 issues a read or write command to device 0, the command will actually be handled by device 1 (and vice versa). This mode may be used to facilitate recovery after a failure or data loss. For example, if the host ordinarily boots from device 0 but is failing to do so (e.g., because the OS files on device 0 have become corrupted), and the OS files are also stored on device 1, the host/driver may place the subsystem 112 in the switch device mode prior to the next boot attempt. This advantageously causes the host to boot from device 1 without the need to modify the host's BIOS.

The switch device mode may also be used in other contexts. For instance, the host 110 may place the storage subsystem 112 in "switch device" mode (to cause the host to subsequently boot or otherwise execute from device 1) upon detecting that NVM array 0 is close to the end of its useful life. This determination may be made by reading out usage/wear-level statistics maintained by the storage subsystem, as disclosed in U.S. patent application Ser. No. 11/429,936, filed on May 8, 2006, the disclosure of which is hereby incorporated by reference. As another example, each controller 114, 115 may be capable of detecting, and reporting to the host, when an unusually high number of ECC or parity errors are occurring on reads from its respective NVM array; and the host may respond by placing the subsystem in "switch device" mode during a subsequent boot up.

Device Selector

In some embodiments, the storage subsystem 112 may include a device selector 121 (FIG. 1), such as a physical switch, that allows a user to manually place the subsystem into, and take the subsystem out of, the switch device mode. The device selector 121 may be provided in addition to, or in lieu of, a command that enables the host to do the same. If both are provided, the device selector may be given priority.

The device selector 121 advantageously allows the subsystem 112 to be placed in the "switch device" mode regardless of whether the subsystem is being used with a host capable of issuing vendor-specific commands. For instance, a user may experience a boot error while using the subsystem with a host system that does not have the subsystem's driver 113 or other special software installed thereon, and which is therefore incapable of sending a "switch device" command to the subsystem. In response to encountering the boot error, the user could use the device selector 121 to activate the "switch device" mode and then restart the host system 110.

III. DATA TRANSFER COMMANDS FOR BACKUP AND RESTORE OPERATIONS

In the embodiment shown in FIG. 1, the storage subsystem 112 implements the following five vendor-specific commands for facilitating backup and restore operations: Backup All, Restore All, Mirror, Backup, Restore. Each of these commands is discussed below. An example of a command format that may be used for Backup All and Restore All commands is shown in FIG. 3. A command format that may be used for Mirror, Backup and Restore commands is shown in FIG. 4.

Backup All Command

The Backup All command directs the subsystem 112 to internally back up the entire contents of NVM array 0 (or a particular zone thereof, as discussed below) to NVM array 1. Any data that is stored in NVM array 1 (or the target zone thereof) is erased or overwritten during this process. This command may be used to efficiently set a recovery point in case of a failure. For example, a host system 110 that has been updating critical files in the storage subsystem 112 may issue a Backup All command to cause the device 0 controller 114 to copy some or all of the files in NVM array 0 to NVM array 1.

In some embodiments, the Backup All command may specify a particular zone to be backed up. In these scenarios, only the files stored in the specified zone of device 0 are copied to device 1. The zones may be created using vendor-specific commands as described in application Ser. No. 11/480,303, referenced above. For example, NVM array 0 can be divided into two zones, zone 1 and zone 2, with only zone 1 being used to store critical data. Rather than backing up all contents of NVM array 0, the backup operation can then be limited to zone 1.

Restore All Command

The Restore All command directs the storage subsystem 112 to internally copy the entire contents of NVM array 1 (or a designated zone thereof) to NVM array 0. Any data that is stored in NVM array 0 (or the target zone thereof) is erased or overwritten during this process. This command may be used to restore files on device 0 that have become corrupted. For example, if the host system 110 has crashed due to possible corruption of OS files on device 0, and has previously created a backup copy on device 1, the host may issue a Restore All command to the storage subsystem 112 and then attempt to re-boot from device 0.

Mirror Command

The Mirror command is the same as a standard write command, except that the storage subsystem 112 writes the data (via the respective controllers 114, 115) to both NVM arrays 116, 117. This command may be used in place of the mirror mode to create a backup copy of data being written to device 0, particularly when the quantity of data being backed up is small.

Backup Command

The backup command causes the subsystem 112 to internally read a designated set of sectors of device 0, and to write (back up) the read-out data to device 1. This command may be used in place of a Backup All command when the quantity of data being backed up is relatively small.

Restore Command

The Restore Command causes the subsystem to read a designated set of sectors in device 1, and to write the data read from these sectors to a corresponding set of sectors in device 0. This command may be used when, for example, the host detects that data stored in a particular sector or set of sectors of device 0 has likely become corrupted.

IV. STORAGE SUBSYSTEM WITH MASTER CONTROLLER

FIG. 5 illustrates a solid-state storage subsystem 512 according to another embodiment of the invention. In this embodiment, the storage subsystem includes N separate NVM arrays 514, each of which is controlled by a respective flash ATA disk controller 516. The number N of NVM arrays may, for example, be 2, 3, 4, 5, 8 or 12. As illustrated by the dashed lines in FIG. 5, in some embodiments, each flash disk controller 516 may also be capable of accessing one or more of the other NVM arrays 514.

Each of the N flash disk controllers 516 communicates with a master controller 520. For example, as the master controller 520 receives read and write commands from the host 110 (which may be ATA commands, PC Card commands, USB commands, etc.), the master controller translates these commands into drive-specific ATA commands that are sent to the corresponding flash disk controllers 516. Data read by the flash disk controllers 514 is transferred to the master controller's buffer 525 before being transferred to the host 110. The master controller 520 includes interface circuitry 522 for communicating with the host 110 in accordance with one or more interface standards (as described above).

The master controller also includes a mode register 524 for enabling the host to specify a particular mode and configuration. The following are examples of modes that may be implemented.

Single Virtualized Disk. When in this mode, the storage subsystem 512 presents itself to the host OS as a single, virtualized disk drive. This virtualized disk drive may include memory space of all or a particular subset of the N NVM arrays 514. If less than all of the NVM arrays are used to implement the virtualized disk drive, one or more of the NVM arrays may be hidden from the host OS and used for redundancy purposes (e.g., to store backup copies of files transparently to the host).

As with the embodiment of FIGS. 1-4, the storage subsystem may include vendor-specific commands that enable the host to back up data to, and restore data from, the hidden NVM array or arrays.

Device 0/Device 1. When in this mode, the storage subsystem 512 presents its storage resources to the host OS as two ATA disk drives, which may be configured as device 0 and device 1. The actual configuration depends on the value of N. For example, if N=2, one of the NVM arrays may correspond to device 0 and the other to device 1, and the subsystem may operate substantially as described for the preceding embodiment. As another example, if N=4, two of the NVM arrays may be used to implement device 0 and device 1 (respectively), and the other two may remain hidden from the host OS and be used for redundancy purposes-one for backing up device 0 data and the other for backing up device 1 data. Vendor-specific backup, restore and mirror commands may be supported to enable the host to backup data to, and restore data from, the hidden NVM arrays.

RAID array. When in this mode, the storage subsystem 512 effectively treats each NVM array 514 as a respective disk drive of a disk array, and operates the disk array in an appropriate RAID (Redundant Array of Inexpensive Disks) configuration. Depending on the value of N, one of the following RAID configurations (as well as others) may be used: RAID 0, 1, 2, 3, 4, 5, 6, 7, 0+1, or 10. The RAID array may be presented to the host 110 as a single virtualized disk drive.

The flash disk controllers 516 and the master controller 520 collectively form the main components of a flash disk array controller 530. The flash disk array controller 530 may be implemented as a single IC device or as multiple IC devices.

The storage subsystem 512 shown in FIG. 5 may otherwise be configured and may operate as described above for the embodiment of FIGS. 1-4. The various features described in connection with the embodiments of FIGS. 1-4 may be incorporated into the embodiment of FIG. 5, and vice versa.

IV. CONCLUSION

While certain embodiments have been described, these embodiments have been presented by way of example only, and are not intended to be limiting. Indeed, the novel methods and systems described herein may be embodied in a variety of other forms, including forms that do not provide all of the features and benefits described herein. Furthermore, various omissions, substitutions and changes in the form of the disclosed methods and systems may be made without departing from the invention. The invention is defined by the accompanying claims.

What is claimed is:

1. A storage subsystem comprising:
    a first controller connected to, and being capable of writing data to and reading data from, a first solid-state non-volatile memory array;
    a second controller connected to, and being capable of writing data to and reading data from, a second solid-state non-volatile memory array; and
    a connector for connecting the storage subsystem to a host system, said connector coupled to the first and second controllers such that the first and second controllers are capable of receiving storage access commands from the host system;
    wherein the first controller is capable of presenting at least a portion of the first non-volatile memory array to the host system as storage space of ATA device 0, and the second controller is capable of presenting at least a portion of the second non-volatile memory array to the host system as storage space of ATA device 1,
    wherein both the first and second solid-state non-volatile memory arrays include operating system files associated with a boot up process of the host system;
    wherein the storage subsystem is capable of being placed into a switch device mode in which data access commands issued by the host system to ATA device 1 are re-directed to the first non-volatile memory array, ATA device 0, and data access commands issued by the host system to ATA device 0 are re-directed to the second non-volatile memory array, ATA device 1, in response to an anticipated failure based on at least one of:
(1) a determination, based at least in part on usage or wear-level statistics of the first solid-state non-volatile memory array, that the first solid-state non-volatile memory array is close to the end of its useful life; and
(2) a command issued by the host system that is triggered at least in part by memory errors in the first solid-state non-volatile memory array reported by the first controller,
wherein the storage subsystem is configured to be placed in the switch device mode prior to an actual failure of the first solid-state non-volatile memory array,
wherein, due to the re-direction of data access commands, the storage subsystem provides the operating system files to the host system from the second solid-state non-volatile memory array when the host system attempts to read such files from the first solid-state non-volatile memory array to cause the host to boot up from the second solid-state non-volatile memory array without a prior failure of a data access command executed at the first non-volatile memory array and without a need to modify the host system's BIOS.

2. The storage subsystem of claim 1, in combination with said host system, wherein the host system is programmed to make the determination that the first solid-state non-volatile memory array is close to the end of its useful life.

3. The storage subsystem of claim 1, wherein the storage subsystem includes a physical switch that enables an operator to place the storage subsystem into the switch device mode.

4. The storage subsystem of claim 1, wherein the storage subsystem implements a command that enables the host system to place the storage subsystem into the switch device mode.

5. The storage subsystem as in claim 1, wherein the first and second controllers are capable of executing non-vendor-specific ATA storage access commands.

6. The storage subsystem of claim 5, wherein the first and second controllers are additionally capable of executing at least one vendor-specific command for backing up data from the first non-volatile memory array to the second non-volatile memory array.

7. The storage subsystem of claim 6, wherein the first and second controllers are additionally capable of executing at least one vendor-specific command for restoring backed up data from the second non-volatile memory array to the first non-volatile memory array.

8. The storage subsystem as in claim 1, wherein the storage subsystem is capable of being placed into a mirror mode in which, when the host system issues a command to write data to the first storage device, the storage subsystem automatically writes all of said data to both the first non-volatile memory array and the second non-volatile memory array.

9. The storage subsystem as in claim 1, wherein the first controller is additionally capable of accessing the second non-volatile memory array, and the second controller is additionally capable of accessing the first non-volatile memory array.

10. The storage subsystem as in claim 1, wherein the first and second controllers and the first and second memory arrays are housed within a housing that complies with a standard form factor used for memory cards.

11. The storage subsystem as in claim 10, wherein the standard form factor is one of the following: CompactFlash, SecureDigital, PCMCIA, MultiMediaCard, SmartMedia, Memory Stick.

12. The storage subsystem as in claim 1, wherein the connector is a USB connector.

13. The storage subsystem as in claim 1, further comprising a third controller that controls a third non-volatile memory array.

14. A storage subsystem, comprising:
first and second solid-state non-volatile memory arrays;
controller circuitry which is capable of writing data to, and reading data from, each of the first and second non-volatile memory arrays in response to commands received from a host system; and
a connector for connecting the storage subsystem to the host system, said connector coupled to the controller circuitry;
wherein the controller circuitry is capable of maintaining the second non-volatile memory array hidden from the host system while using the second non-volatile memory array to maintain a backup copy of data written by the host system to the first non-volatile memory array, such that the backup copy is maintained transparently to the host system, and
wherein the controller circuitry implements non-vendor-specific ATA storage access commands, and implements at least one vendor-specific command that enables the host system to access backup data stored in the second non-volatile memory array,
wherein the storage subsystem is capable of being placed into a switch device mode in which commands received from the host system for the first non-volatile memory array, presented to the host system as ATA device 0, are performed on the second non-volatile memory array, presented to the host system as ATA device 1, in response to an anticipated failure of the first non-volatile memory array based on at least one of:
(1) a determination, based at least in part on usage or wear-level statistics of the first non-volatile memory array, that the first non-volatile memory array is close to the end of its useful life; and
(2) a command issued by the host system that is triggered at least in part by memory errors in the first non-volatile memory array reported by the controller,
wherein the storage subsystem is configured to be placed in the switch device mode prior to an actual failure of the first solid-state non-volatile memory array,
wherein, due to the re-direction of data access commands, the storage subsystem provides the operating system files to the host system from the second solid-state non-volatile memory array when the host system attempts to read such files from the first solid-state non-volatile memory array to cause the host to boot up from the second solid-state non-volatile memory array without a prior failure of a data access command executed at the first non-volatile memory array and without a need to modify the host system's BIOS.

15. The storage subsystem as in claim 14, wherein the controller circuitry and the first and second non-volatile memory arrays are housed within a housing that complies with a standard form factor used for memory cards.

16. The storage subsystem of claim 14, in combination with said host system, wherein the host system is programmed to make the determination that the first non-volatile memory array is close to the end of its useful life.

17. The storage subsystem as in claim 14, wherein the controller circuitry is further capable of using the backup copy maintained in the second non-volatile memory array to restore lost data lost from the first non-volatile memory array.

* * * * *